United States Patent [19]
Garfinkle

[11] Patent Number: 5,530,469
[45] Date of Patent: Jun. 25, 1996

[54] INTERACTIVE TELEVISION WITH CORRELATION OF VIEWERS INPUT AND RESULTS MADE AVAILABLE TO EACH VIEWER

[76] Inventor: Norton Garfinkle, 2800 S. Ocean Blvd., Boca Raton, Fla. 33432

[21] Appl. No.: 359,536

[22] Filed: Dec. 20, 1994

[51] Int. Cl.⁶ ................................................. H04N 7/173
[52] U.S. Cl. .................................. 348/1; 348/13; 455/2; 455/5.1
[58] Field of Search .................. 348/1, 3, 5, 6, 348/12, 13; 455/2, 3.1, 5.1, 6.1, 4.2; H04N 7/16, 7/173

[56] References Cited

U.S. PATENT DOCUMENTS

| | | | |
|---|---|---|---|
| 4,566,030 | 1/1986 | Nickerson et al. | 348/1 |
| 4,584,602 | 4/1986 | Nakagawa | 348/1 |
| 4,603,232 | 7/1986 | Kurland et al. | 348/1 |
| 5,091,877 | 2/1992 | Itoh et al. | 348/1 |
| 5,251,324 | 10/1993 | McMullan, Jr. | 348/1 |
| 5,311,423 | 5/1994 | Clark | 348/6 |
| 5,351,075 | 9/1994 | Herz et al. | 348/1 |
| 5,363,433 | 11/1994 | Isono | 348/1 |

*Primary Examiner*—Safet Metjahic
*Assistant Examiner*—Chris Grant
*Attorney, Agent, or Firm*—Lane, Aitken & McCann

[57] ABSTRACT

An interactive television system in which the television program and a computer program are integrated to provide a viewer-friendly environment in which the viewer can participate on a real time basis with other viewers. The programmed computer system receives inputs from viewers in response to the television program content. A programmed interactive computer system processes the viewer inputs in accordance with parameters and algorithms correlated with the transmitted television program material. The system processes, for each participating viewer, his or her results based on the algorithm for the broadcast television program and the inputs of the other participating viewers. This individual data is stored and is made accessible to the viewer; in the preferred embodiment via a voice synthesizer to the participating viewer who initiates a call to the system.

6 Claims, 2 Drawing Sheets

INTERACTIVE TELEVISION WITH CORRELATION OF VIEWERS INPUT AND RESULTS MADE AVAILABLE TO EACH VIEWER

BACKGROUND OF THE INVENTION

1. Field of the Invention

This invention relates to an interactive television system, and more particularly, to a computerized interactive television system in which viewer inputs are correlated in real time with other viewer inputs, and particularized results made available to each participating viewer.

2. Description of the Prior Art

There are a number of prior art proposals for interactive television. Some of these proposals have been implemented, such as, for example, home shopping television programs. More sophisticated proposals include a system reported in the New York Times on Aug. 17, 1994 as being developed by Econ Corporation to take advantage of the new wireless interactive television services being licensed by the FCC. Here, viewers would use on-screen menus to select program options or respond to advertisements. A control center processes and routes data between viewers homes and service providers over a satellite link. Cell sites, which are similar to relay stations used in cellular phone networks, are links between the viewers and the satellite. A wireless unit passes data to and from the cell site and viewers use a remote control device to make inputs from an on-screen menu.

These prior art proposals are limited in their interactive reach. Only in a broad sense do they integrate viewer input into the program itself. The television home shopping programs are an example. The program hosts may engage in a conversation with one of the viewers relative to the merchandise being offered and may display or report a tally of the number of units purchased. But these prior art interactive television systems to not provide for the integration into the program of all participating viewers both collectively and individually in an active role.

SUMMARY OF THE INVENTION

An object of this invention is the provision of a computerized interactive television system that correlates viewer responses and provides particularized results to participating viewers.

Another object of this invention is the provision of a computerized interactive television system that can be readily and inexpensively implemented with presently existing technology and facilities.

Briefly, this invention relates to an interactive television system in which the television program and a computer program are integrated to provide a viewer-friendly environment in which the viewer can participate on a real time basis with other viewers. The programmed computer system, which may, if desired, use service bureau computer equipment, receives inputs from viewers in response to the television program content. The viewer input is preferably (although not necessarily) coupled over a publicly switched telephone network. Voice inputs are contemplated in the preferred embodiment of the invention, although provision could be made also for other inputs, such as DTMF tones (i.e. standard telephone touch tone inputs). The programmed interactive computer system processes the viewer inputs in accordance with parameters and algorithms correlated with the transmitted television program material, including announced objectives to which those viewers who elect to participate respond. The computer system also tabulates the input data across all participants responding to a particular televised objective or set of objectives and feeds the overall tabulated data to television station or cable head for real time broadcast. The system processes, for each participating viewer, his or her results based on the algorithm for the broadcast television program and the inputs of the other participating viewers. This individual data is stored and is made accessible to the viewer; in the preferred embodiment via a voice synthesizer to the participating viewer who initiates a call to the system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
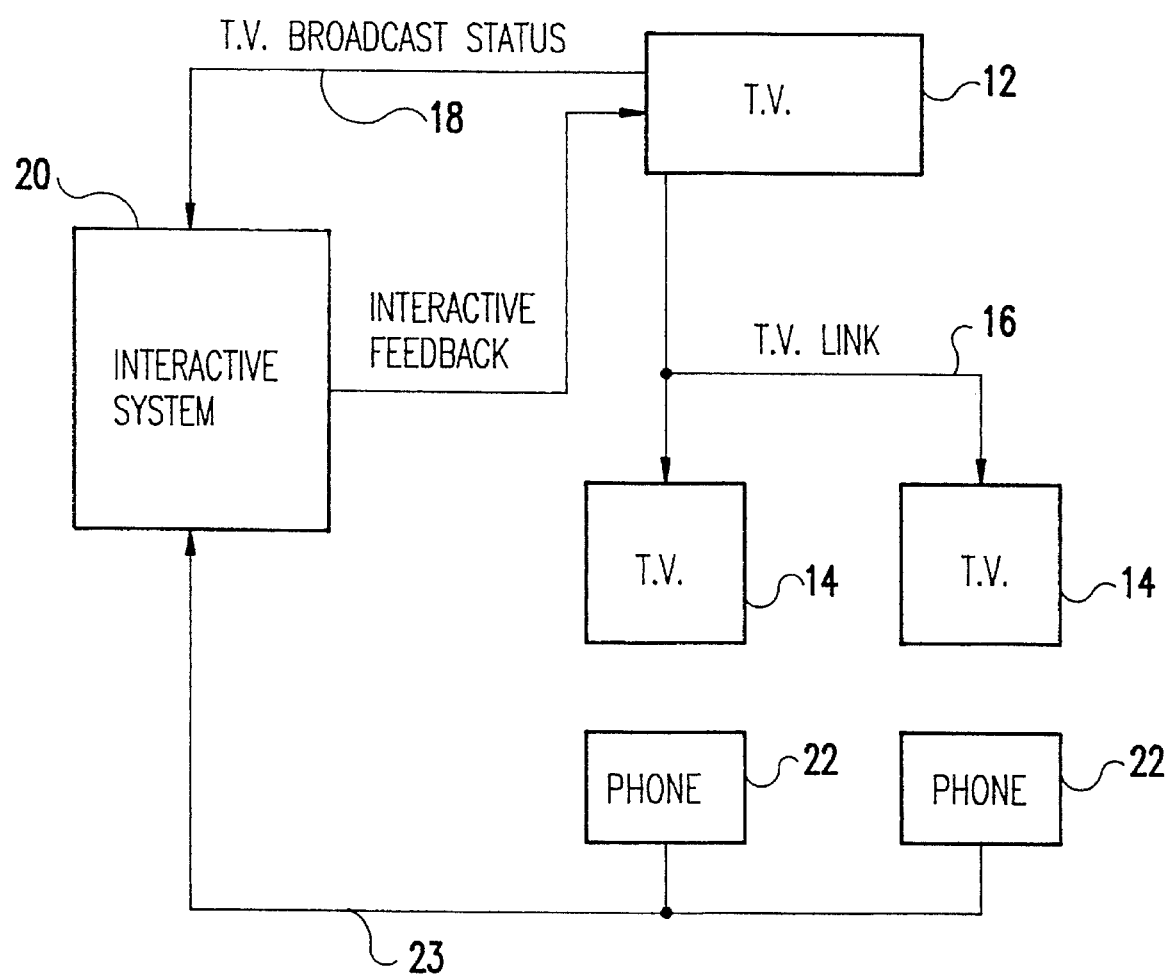
FIG. 1 is a block diagram of an interactive television system in accordance with the teachings of this invention.

Referring now to FIG. 1, a television source 12, such as a commercial television broadcast station or cable head, transmits television program material to a plurality of viewer sets 14 over a link 16. The program material is preferably specially prepared or adapted for interactive participation by viewers at sets 14. The program material may be prerecorded or a live broadcast and includes recurrent prompts for viewer response. The progression of the broadcast program material may be coupled over a suitable link 18 to an interactive computer system 20. The system 20 includes a memory in which is loaded data parameters to analyze and tabulate viewer responses to the program material, a program routine for tabulating collective data based on all or a selected group of viewer responses, and a program routine for tabulating individual performance data as a function of group response.

The interactive processor 20 may be located at the broadcast station 12, but is preferably located at a central station, such as a computer service bureau, and the interactive system 20 may serve more than one broadcast location 12. Viewers who wish to participate in the interactive program material may respond via telephone sets 22 and a public, switched telephone network 23, which provides a dial up connection to the interactive system 20. Alternative response technologies, such as that discussed in the previously referenced New York Times article, are also within the scope of this invention.

Figure 2:
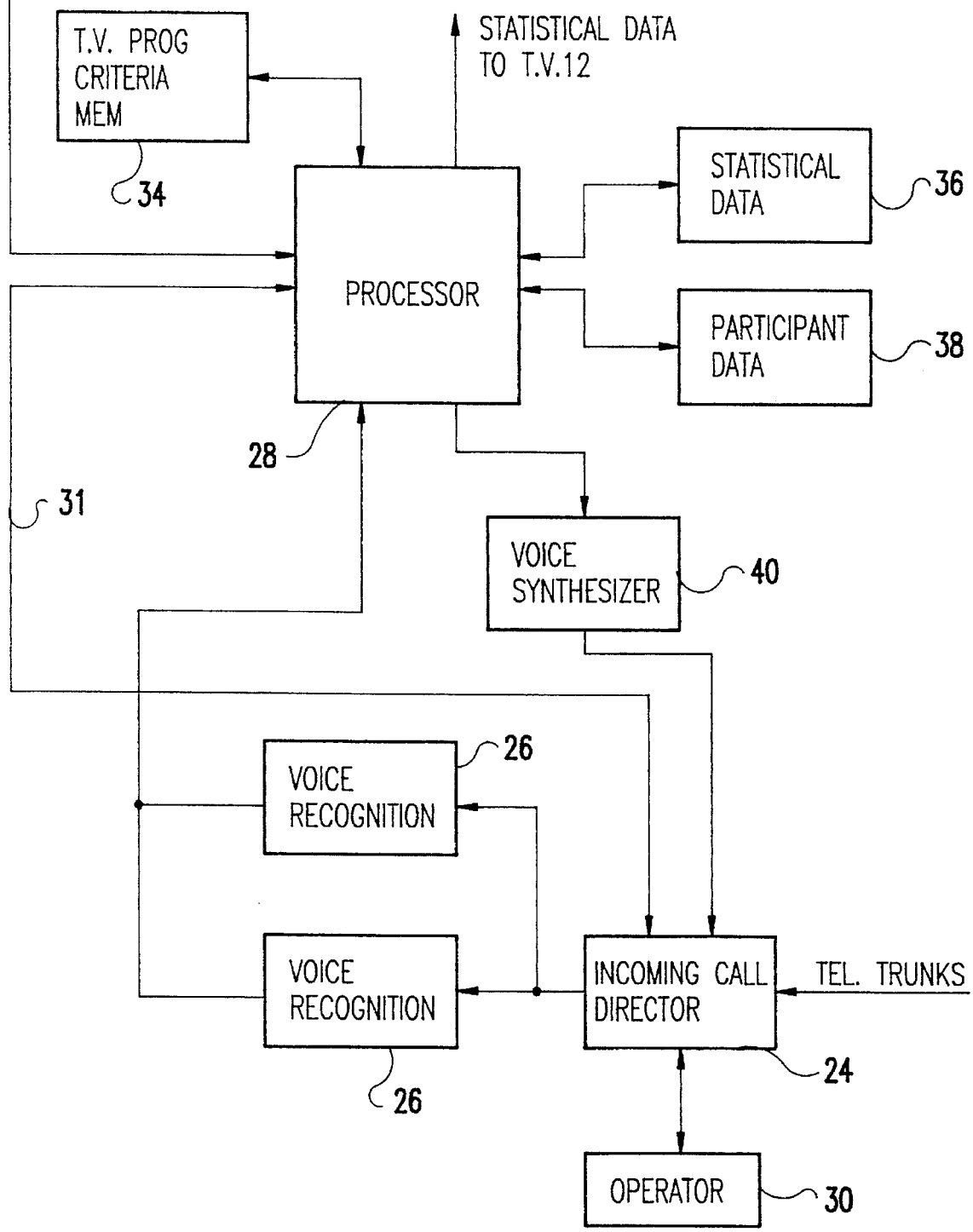
FIG. 2 is a block diagram of the logical components of one embodiment of a computer system for carrying out the functions of the interactive television system of the invention.

Referring now to FIG. 2, in this specific embodiment of the invention, incoming telephone trunks carrying viewer calls are connected to an incoming call director 24 of a suitable commercially available design. The call director 24 answers a call and directs it, in this preferred embodiment of the invention, to an available one of a number of speaker independent voice recognition units 26. In an alternative embodiment of the invention, the interactive system responds to DTMF tone inputs and the call director 24 would connect the incoming calls to a suitable decoder for the DTMF signals.

The digital outputs of the voice recognition units 26, along with the telephone company caller identification data decoded by call director 24, are coupled as inputs to a processor 28. The processor 28 tests the incoming data against program parameters in order to determine if the incoming call has been properly received and encoded. If it has not, the processor 28 signals the incoming call director via link 31, and the call director directs the call to an operator 30, who can converse with the viewer and enter the viewer response into the processor 28 via a keyboard and link 31.

An incoming call may be either a viewer response to the television program material or a viewer requesting his or her performance statistics from a television program in which he or she participated. In a simple format, the viewer can be prompted by the television program, or by a recording from the distributor 24, to provide a password indicating the class of viewer call (e.g. "play" or "results").

For each interactive television program, a data base of parameters and tabulation routines is stored in a memory 34. The parameters are time correlated to the television program material, or content correlated, or a combination of the two. If the television material is pre-recorded, a simple clock synchronized to the start of the broadcast may used. It can correlate incoming viewer responses on the basis of a time window in which they were received to a time stamped sequence of parameters in memory 34. If the television program material does not follow in a fixed time sequence, the appropriate signals can be sent from the television source 12 to the processor 28. For some television program materials, the correlation between the parameters stored in memory 34 and the viewer response can be on the basis of the content of the viewer response.

For each viewer call, the viewer response is compared to the stored parameter and the results of the comparison along with the results of the responses of all viewers for a particular television program are stored in a memory 38. Concurrently, the responses of all responding viewers (or groups of viewers) are tabulated in accordance with a routine stored in memory 34 and the tabulated results are stored in a memory 36. These tabulated results in memory 36 can be transmitted via the processor 28 to the television station 12 for broadcast and/or display.

A viewer participant can also dial up the interactive system in order to learn tabulated results of his or her participatory inputs to the television program and a program computation the individual relative to all responses or all responses from a relevant group. The inbound call director 24 again directs the call to a voice recognition unit 26 where the voice request is converted to a digital input to processor 28 along with the telephone company caller identification data. The processor 28 fetches the participant data from memory 38 and the tabulated data for all participants from memory 36. Processor 28 calculates a result based on a routine, which may be stored in memory 34. This routine is particularized to the content of the television program, and the processor transfers the digital data result to a voice synthesizer 40. Of course, if desired, results for all participants can be calculated and stored rather than calculating the results in response to a caller request, as suggested here. The voice synthesizer 40 announces results to the caller via telephone link established by the call director 24.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An interactive television system to allow viewers to interact with televised program material, comprising in combination:

means for digitally encoding inbound audio telephone call information;

means for directing inbound audio calls as inputs to said means for digitally encoding inbound audio telephone call information;

a computer processor;

means for coupling an output of said means for digitally encoding inbound audio telephone call information to an input of said computer processor;

means for storing parameters and computer program routines for correlating multiple viewer responses with said television program material;

said computer processor computing a result for each viewer based on said multiple viewer responses and a tabulation of results for a group of viewers in response to said digitally encoded inbound audio telephone call information, said computation made in accordance with said parameters and computer routines accessed from said means for storing;

a second means for storing said result for each viewer and a tabulation of results for a group of responding viewers;

said computer processor calculating a composite result for a viewer based on the viewer's result and said results for a group of responding viewers; and voice synthesizer means coupled to said processor to transmit said composite result to a viewer in response to a viewer request for said composite result.

2. An interactive television system to allow viewers to interact with televised program material as in claim 1 wherein said viewer responses are correlated with said television program material based upon a time of receipt of said viewer responses.

3. An interactive television system to allow viewers to interact with televised program material as in claim 1 wherein said viewer responses are correlated with said television program material based upon content of said viewer responses.

4. An interactive television system to allow viewers to interact with televised program material, comprising in combination:

means for encoding inbound telephone call information;

a computer processor;

means for coupling an output of said means for encoding inbound telephone call information to an input of said computer processor;

means for storing parameters and computer program routines for correlating viewer responses with said television program material;

said computer processor computing a result for each viewer and a tabulation of results for a group of viewers in response to said inbound telephone call information, said computation made in accordance with said parameters and computer routines accessed from said means for storing;

a second means for storing said result for each viewer and a tabulation of results for a group of responding viewers;

said computer processor calculating a composite result for a viewer based on the viewer's result and said results for a group of responding viewers; and means coupled to said processor to transmit said composite result to a viewer in response to a viewer request for said composite result.

5. An interactive television method to allow viewers to interact with televised program material, comprising in combination:

encoding inbound telephone call information;

storing parameters and computer program routines for correlating viewer responses with said television program material;

computing a result for each viewer and a tabulation of results for a group of viewers in response to said inbound telephone call information, said computation made in accordance with said parameters and computer routines from said storing parameters and computer program routines step;

storing said result for each viewer and a tabulation of results for a group of responding viewers;

calculating a composite result for a viewer based on the viewer's result and said results for a group of responding viewers; and transmitting said composite result to a viewer in response to a viewer request for said composite result.

6. An interactive method to allow a plurality of users to interact with program material, comprising in combination:

encoding inbound user responses from said plurality of users;

storing parameters and computer program routines for correlating user responses with said program material;

computing a result for each user and a tabulation of results for a group of users in response to said inbound user responses, said computation made in accordance with said parameters and computer routines from said parameters and computer program routines step storing;

storing said result for each user and a tabulation of results for a group of responding users;

calculating a composite result for a user based on the user's result and said results for a group of responding users; and transmitting said composite result to a user in response to a user request for said composite result.

\* \* \* \* \*

UNITED STATES PATENT AND TRADEMARK OFFICE
CERTIFICATE OF CORRECTION

| | | |
|---|---|---|
| PATENT NO. | : 5,530,469 | |
| APPLICATION NO. | : 08/359536 | |
| DATED | : June 25, 1996 | |
| INVENTOR(S) | : Norton Garfinkle | |

It is certified that error appears in the above-identified patent and that said Letters Patent is hereby corrected as shown below:

In column 6, line 12, --storing-- should be added before "parameters"

In column 6, lines 13-14, "storing" should be deleted

Signed and Sealed this
Nineteenth Day of April, 2011

David J. Kappos
*Director of the United States Patent and Trademark Office*

US005530469C1

(12) EX PARTE REEXAMINATION CERTIFICATE (9567th)

United States Patent
Garfinkle

(10) Number: US 5,530,469 C1
(45) Certificate Issued: Mar. 19, 2013

(54) INTERACTIVE TELEVISION WITH CORRELATION OF VIEWERS INPUT AND RESULTS MADE AVAILABLE TO EACH VIEWER

(75) Inventor: Norton Garfinkle, Boca Raton, FL (US)

(73) Assignee: Interactive Television Company, LLC, New York, NY (US)

Reexamination Request:
No. 90/011,228, Sep. 13, 2010
No. 90/011,240, Sep. 29, 2010

Reexamination Certificate for:
Patent No.: 5,530,469
Issued: Jun. 25, 1996
Appl. No.: 08/359,536
Filed: Dec. 20, 1994

Certificate of Correction issued Apr. 19, 2011.

(51) Int. Cl.
*H04N 7/173* (2006.01)
(52) U.S. Cl.
USPC .................. 725/116; 348/E7.071; 725/24
(58) Field of Classification Search .................. None
See application file for complete search history.

(56) References Cited

To view the complete listing of prior art documents cited during the proceedings for Reexamination Control Numbers 90/011,228 and 90/011,240, please refer to the USPTO's public Patent Application Information Retrieval (PAIR) system under the Display References tab.

*Primary Examiner* — Ovidio Escalante

(57) ABSTRACT

An interactive television system in which the television program and a computer program are integrated to provide a viewer-friendly environment in which the viewer can participate on a real time basis with other viewers. The programmed computer system receives inputs from viewers in response to the television program content. A programmed interactive computer system processes the viewer inputs in accordance with parameters and algorithms correlated with the transmitted television program material. The system processes, for each participating viewer, his or her results based on the algorithm for the broadcast television program and the inputs of the other participating viewers. This individual data is stored and is made accessible to the viewer; in the preferred embodiment via a voice synthesizer to the participating viewer who initiates a call to the system.

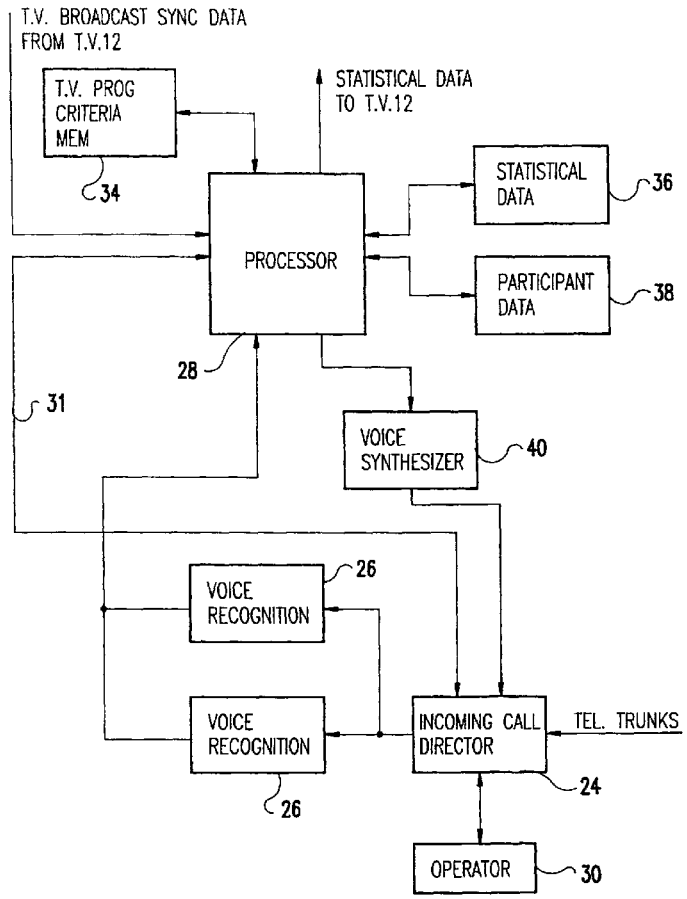

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

\* \* \* \* \*